No. 811,031. PATENTED JAN. 30, 1906.
G. H. BROWN.
MACHINE FOR MAKING VENEER STAVE BARRELS.
APPLICATION FILED OCT. 31, 1904.

3 SHEETS—SHEET 1.

Witnesses  
Howard D. Orr  
J. F. Riley

George H. Brown, Inventor,
By E. G. Siggers
Attorney

No. 811,031. PATENTED JAN. 30, 1906.
G. H. BROWN.
MACHINE FOR MAKING VENEER STAVE BARRELS.
APPLICATION FILED OCT. 31, 1904.

3 SHEETS—SHEET 2.

George H. Brown, Inventor,

Witnesses

No. 811,031. PATENTED JAN. 30, 1906.
G. H. BROWN.
MACHINE FOR MAKING VENEER STAVE BARRELS.
APPLICATION FILED OCT. 31, 1904.

3 SHEETS—SHEET 3.

George H. Brown, Inventor,

Witnesses
Howard D. Orr
N. F. Riley

By E. G. Siggers
Attorney

UNITED STATES PATENT OFFICE.

GEORGE HENRY BROWN, OF NORFOLK, VIRGINIA.

MACHINE FOR MAKING VENEER-STAVE BARRELS.

No. 811,031.   Specification of Letters Patent.   Patented Jan. 30, 1906.

Application filed October 31, 1904. Serial No. 230,811.

*To all whom it may concern:*

Be it known that I, GEORGE HENRY BROWN, a citizen of the United States, residing at Norfolk, in the county of Norfolk and State of Virginia, have invented a new and useful Machine for Making Veneer-Stave Barrels, of which the following is a specification.

The invention relates to a machine for making veneer-stave barrels.

The object of the present invention is to improve the construction of barrel-forming machines and to provide a simple, inexpensive, and efficient one adapted to enable a barrel, keg, or similar approximately cylindrical receptacle to be rapidly constructed of veneer staves and capable of dispensing with the rotary form usually employed in such machines and of enabling the barrel or partially-formed barrel to be rotated until completed.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

Figure 1:
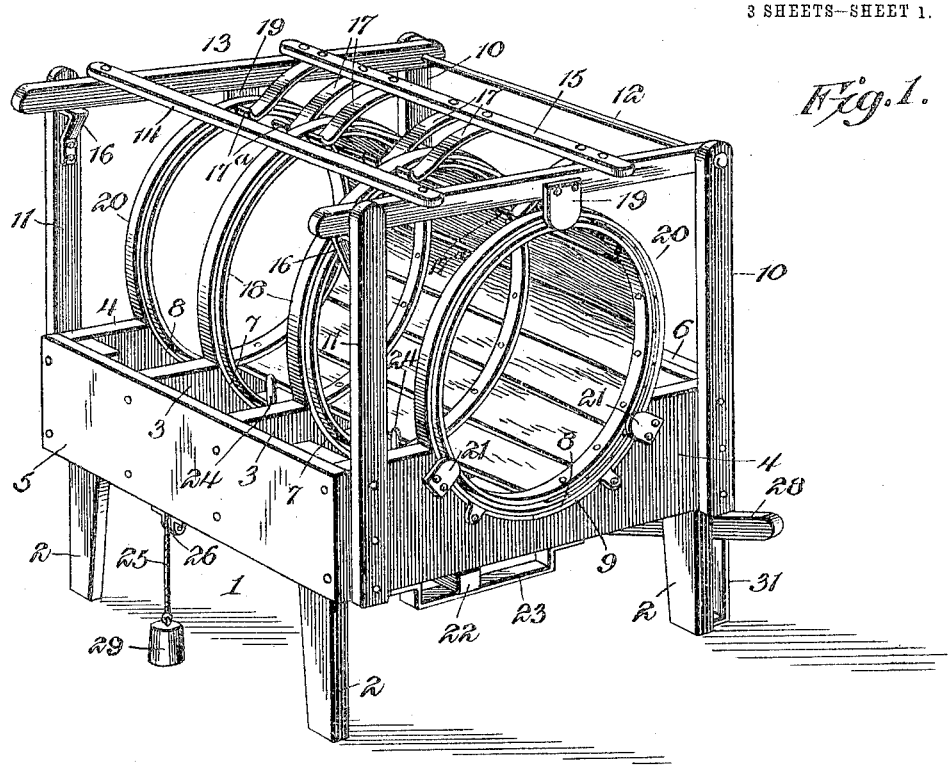
Figure 4:
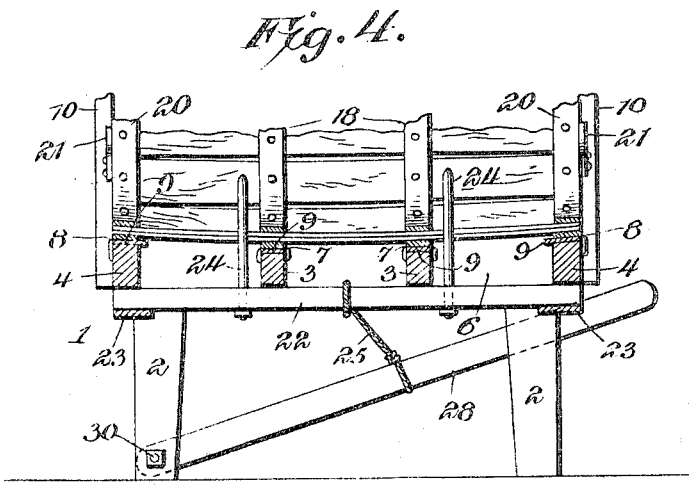
Figure 2:
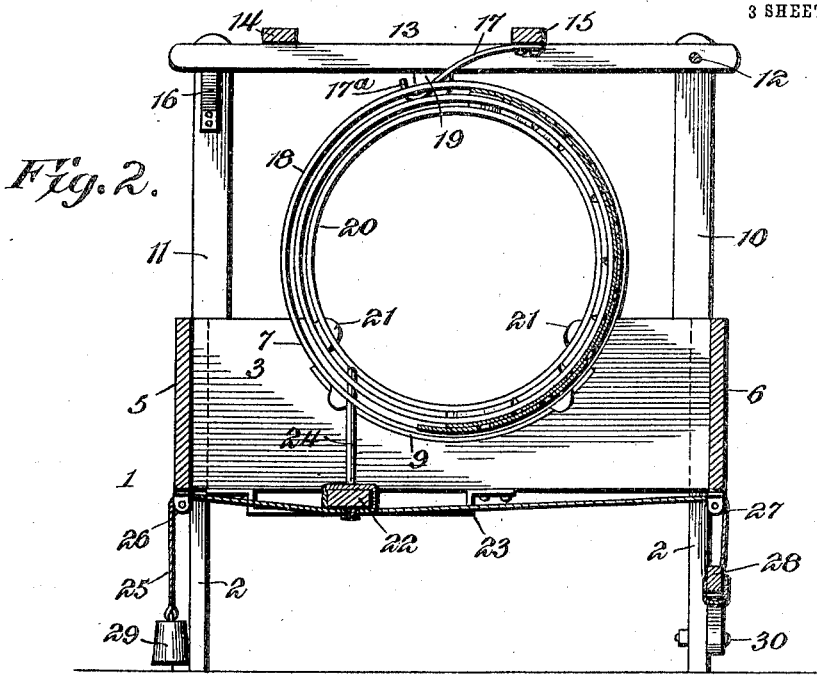
Figure 3:
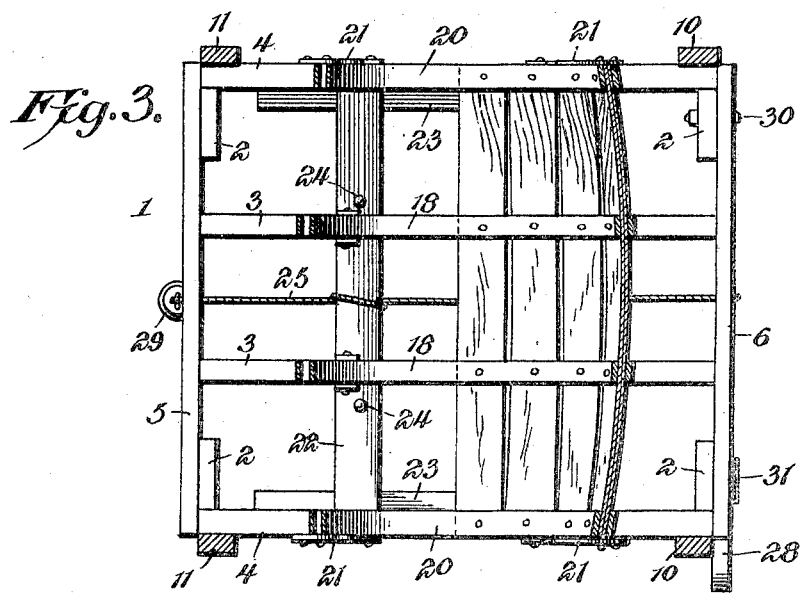
Figure 5:
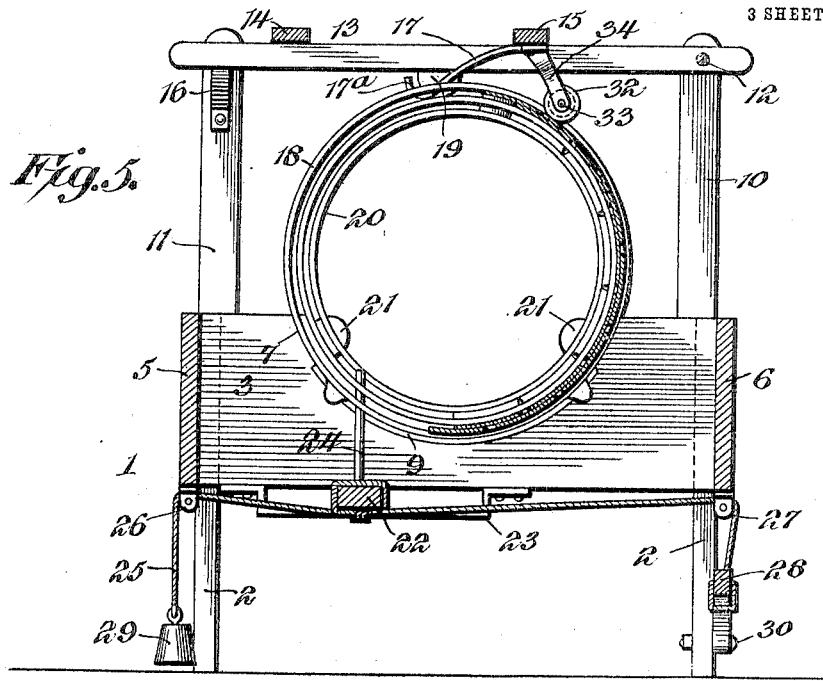
Figure 6:
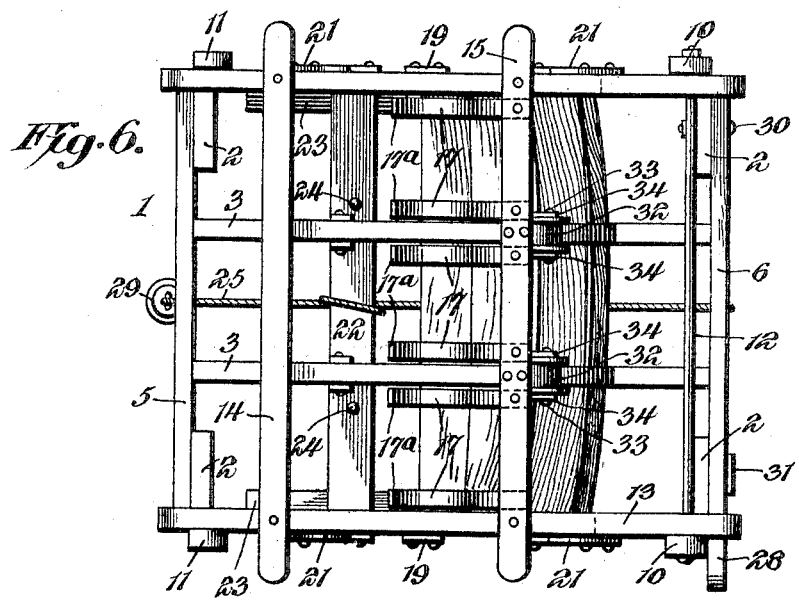

In the drawings, Figure 1 is a perspective view of a barrel-forming machine constructed in accordance with this invention. Fig. 2 is a vertical sectional view of the same, taken transversely of the barrel. Fig. 3 is a horizontal sectional view taken substantially on the line 3 3 of Fig. 2. Fig. 4 is a longitudinal sectional view of the lower portion of the machine. Fig. 5 is a vertical sectional view of a barrel-machine, showing another form of the invention. Fig. 6 is a plan view of the same.

Like numerals of reference designate corresponding parts in all the figures of the drawings.

1 designates a frame or stand having supporting-legs 2 and provided with intermediate and end cross-bars 3 and 4, arranged parallel to each other and connected at their ends by longitudinal side bars 5 and 6. The cross-bars are provided with alined arcuate bearing-recesses 7 and 8, adapted to receive barrel-hoops and constituting a fixed concave form in which the partially-completed barrel is rotated until completed, as hereinafter explained. The bearing or hoop receiving recesses of the intermediate cross-bars are slightly deeper than the end recesses to produce the desired bilge of a barrel or other receptacle. These bearing or hoop receiving recesses, which may be of any relative depth, as will be readily understood, are provided with clenching-surfaces consisting of curved bars or pieces 9 of metal, which are adapted, when the nails are driven into the barrel or other receptacle, as hereinafter explained, to clench them on the exterior of the barrel, whereby the staves and the hoops are securely fastened together.

The barrel or other receptacle is constructed of hoops and veneer staves, the veneer staves being much thinner and more easily shaped or otherwise handled than ordinary barrel-staves. The curved bars are provided with depending perforated ears, which are suitably secured to the cross-bars of the base or stand of the machine.

Rising from the corners of the base or stand are uprights or standards 10 and 11, preferably consisting of wooden bars suitably secured to the exterior of the base or stand. The upper ends of the bars 10 are pierced by a horizontal rod 12, which forms a pivot for an upper frame or support 13, extending transversely of the machine and consisting of side bars and suitable connecting-bars 14 and 15. The side bars are supported at their free ends by means of brackets 16, secured to the inner faces of the standards 11 and consisting of horizontal upper portions and inclined portions or braces which are secured at their lower ends to the inner faces of the standards 11. The connecting-bar 15 is located in rear of the center of the machine and is provided with inclined fingers 17, constructed of resilient material and adapted to receive the upper portions of the hoops for supporting them in the fixed concave hoop-receiving forms in the position they occupy in a finished barrel, as clearly illustrated in Fig. 1 of the drawings, while the barrel or other receptacle is being constructed. The intermediate fingers are arranged in pairs at opposite sides of the intermediate hoops 18, and the end fingers coöperate with depending stops 19, arranged at the outer edges of the end hoops 20 and consisting of plates secured to and extending downward from the side bars of the hinged frame or support 13. The inclined fingers are slightly curved, as shown, and their lower ends 17$^a$ are bent upward to present smooth lower faces to the barrel, and they are adapted to receive between them hoops of different diameters, as the said inclined fingers will yield to and be flexed by the staves. After the barrel has been partially completed and the staves extend to the top of the same the resilient fingers will be flexed by the staves and are adapted to permit the barrel to be freely rotated by means hereinafter explained. The hinged frame or support is adapted to be readily swung upward to carry the resilient hoop-supporting fingers beyond the barrel.

The end cross-bars 4 are also provided with upwardly-extending stops 21, consisting of plates projecting at the bearing-recesses of the said bars 4. These stops hold the barrel against longitudinal movement and retain the hoops in the same vertical planes as the cross-bars 3 and 4.

In constructing a barrel or other receptacle the exterior hoops are made the proper size and are placed within the machine, the interiorly-arranged hoops shown in the accompanying drawings not being applied until all of the staves have been first nailed to the said exterior hoops. The staves are then placed in the machine one at a time, and the nails are driven into them from the interior and at the bottom of the machine, the ends of the nails being bent or clenched against the exterior of the barrel by the said clenching-surfaces. After the stave or staves at the bottom of the barrel have been nailed in this manner to the exterior hoops the partially completed or constructed barrel is rotated a short distance by a slide 22 and another stave or staves are placed in position, the barrel being partially rotated as it is nailed stave by stave.

The slide consists of a horizontal bar, arranged beneath the cross-bars in guides 23, consisting of metal straps or bars angularly bent at the ends, as clearly shown in Figs. 1 and 2 of the drawings. The slide is provided with a plurality of upwardly-projecting pins or rods 24, located at opposite sides of the center of the machine, or at any other suitable points, and projecting beyond the concave surfaces of the hoop-receiving forms and beyond the hoops and arranged to engage the edge of the staves at the bottom of the barrel. The slide is connected at its center to a flexible connection consisting, preferably, of a rope 25, extending from the slide to opposite sides of the machine and depending from pulleys 26 and 27 or other suitable guides. One end of the flexible connection is attached to a foot-lever 28 to move the slide for partially rotating the barrel, and the other end of the flexible connection is provided with a weight 29, which returns the slide to its initial position. The foot-lever 28 is fulcrumed at one end by a bolt 30 or other suitable pivot on one of the legs 2 at the lower end thereof.

The other end portion of the lever is arranged in a vertical guide 31, consisting of a metal plate having an angularly-bent lower end secured to the lower end of the adjacent leg 2 and attached at its upper end to the contiguous side bar. The foot-lever projects beyond the guide 31 in position to be readily depressed by the foot of the operator, and it is normally held in an elevated position by the weight. The lever when depressed carries the pins or rods of the slide into engagement with the bottom stave, and the partially-finished barrel is successively rotated a short distance as it is nailed stave by stave. This operation is repeated, the unfinished barrel being rotated step by step until all the staves have been nailed to the exterior hoops. The interiorly-arranged hoops are then placed within the barrel and are nailed to the same.

In Figs. 5 and 6 is illustrated another form of the invention, in which the finger-bar 15 is also provided with a plurality of grooved hoop-supporting rollers 32, arranged to engage the intermediate hoops 18 and adapted to assist in retaining the same in position within the machine. They also enable the successive partial rotation of the partially-completed barrel to be effected with greater ease. These grooved rollers are mounted on suitable pivots or spindles 33, arranged in bearings or arms 34, extending downwardly and rearwardly from the finger-bar, as clearly shown in Fig. 5 of the drawings. Although in Figs. 5 and 6 rollers are shown only at the intermediate hoops, yet they may be provided for engaging the end hoops, if desired.

Having thus fully described my invention, what I claim as new, and desire to secure by Letters Patent, is—

1. A barrel-machine embodying a fixed concave form provided with clenching-surfaces and adapted to receive hoops and staves, and means for rotating the same within the form independently thereof.

2. A barrel-machine embodying fixed concave hoop-receiving forms provided with clenching-surfaces, and means for supporting the hoops thereon in the same relation to each other as they occupy in a finished barrel.

3. A barrel-machine embodying fixed concave hoop-receiving forms provided with clenching-surfaces, and means for supporting the hoops thereon in the same relation to each other as they occupy in a finished barrel.

4. A barrel-machine embodying a fixed concave form provided with clenching-surfaces and adapted to receive hoops and staves, said form being arranged to permit the hoops and staves to be rotated independently of it.

5. A barrel-machine embodying fixed concave hoop-receiving surfaces, and a movable member provided with means projecting beyond the said surfaces and the hoops for engaging a stave to partially rotate an unfinished barrel.

6. A barrel-machine embodying fixed concave hoop-receiving surfaces, a slide provided with means projecting between the hoop-receiving surfaces for directly engaging the staves to partially rotate an unfinished barrel, and operating mechanism connected with the slide.

7. A barrel-machine embodying fixed concave hoop-receiving surfaces, a slide provided with a plurality of pins projecting beyond the hoop-receiving surfaces and the hoops to engage a stave for partially rotating an unfinished barrel, and means for operating the slide.

8. A barrel-machine embodying fixed concave hoop-receiving surfaces, a movable member provided with means for directly engaging a stave to partially rotate an unfinished barrel, a lever connected with the said member for moving the same in one direction, and automatically-operable means for moving the said member in the opposite direction to return the same to its initial position.

9. A barrel-machine embodying fixed concave hoop-receiving forms, a slide provided with means for directly engaging a stave for partially rotating an unfinished barrel, a foot-lever for moving the slide in one direction, and a weight for moving it in the opposite direction.

10. A barrel-machine embodying fixed concave hoop-receiving surfaces, and superimposed hoop-supports arranged to engage the upper portion of the hoops for retaining them in the same relation to each other as they occupy in a finished barrel.

11. A barrel-machine embodying fixed concave hoop-receiving surfaces, and superimposed hoop-supports arranged to receive the upper portions of the hoops for retaining them on the said surfaces in the same position as they occupy in a finished barrel, the said hoop-supports being resilient to enable them to be flexed by the staves.

12. A barrel-machine having fixed hoop-receiving surfaces and provided with spaced hoop-supporting fingers for holding the hoops in the same relation to each other as they occupy in a finished barrel.

13. A barrel-machine embodying fixed concave hoop-receiving surfaces, and spaced fingers located above the said surfaces for holding the hoops in the same relation to each other as they occupy in a completed barrel, said fingers being inclined to receive hoops of different diameters.

14. A barrel-machine embodying fixed concave hoop-receiving clenching-surfaces, and a superimposed hinged support provided with means for holding the hoops on the said surfaces in the same relation to each other as they occupy in a finished barrel.

15. A barrel-machine embodying a stand provided with lower fixed concave hoop-receiving surfaces, a hinged frame located above the said surfaces and provided with means for supporting the hoops on the surfaces in the same relation to each other as they occupy in a completed barrel, and end stops projecting from the stand and from the frame and arranged to engage the ends of an unfinished barrel.

16. A barrel-machine, comprising a stand having fixed concave barrel-receiving surfaces and provided with standards arranged in pairs, a frame hinged to one pair of the standards, brackets mounted on the other pair of standards and supporting the frame, and means carried by the frame for supporting the hoops on the surfaces in the same relation to each other as they occupy in a finished barrel.

17. A barrel-machine embodying a frame having fixed concave hoop-receiving surfaces, and a superimposed hoop-engaging roller arranged to receive the upper portion of the hoop for holding the same in position.

18. A barrel-machine embodying a frame having fixed concave hoop-receiving surfaces, means for supporting the hoops on the surfaces in the same relation to each other as they occupy in a finished barrel, and a grooved roller arranged to receive the upper portion of a hoop for holding the same against upward movement.

In testimony that I claim the foregoing as my own I have hereto affixed my signature in the presence of two witnesses.

GEORGE HENRY BROWN.

Witnesses:
JNO. W. STEEL,
DAVID PENDER.